(No Model.)  7 Sheets—Sheet 1.

D. GESSNER.
CLOTH PRESSING MACHINE.

No. 565,072.  Patented Aug. 4, 1896.

Witnesses:
J. E. Greer.
Fred Kempfer.

Inventor:
David Gessner
by Gifford & Law, Atty's.

(No Model.) 7 Sheets—Sheet 2.

D. GESSNER.
CLOTH PRESSING MACHINE.

No. 565,072. Patented Aug. 4, 1896.

Witnesses:
J. E. Greer
Fred Kemper

Inventor:
David Gessner
by Gifford & Law, Att'ys.

UNITED STATES PATENT OFFICE.

DAVID GESSNER, OF WORCESTER, MASSACHUSETTS.

CLOTH-PRESSING MACHINE.

SPECIFICATION forming part of Letters Patent No. 565,072, dated August 4, 1896.

Application filed October 25, 1893. Serial No. 489,086. (No model.)

*To all whom it may concern:*

Be it known that I, DAVID GESSNER, of Worcester, in the State of Massachusetts, have invented a new and useful Improvement in Cloth-Pressing Machines, of which the following is a specification.

Figs. 6, 7, 8, 9, 10, and 11 are details. Figs. 19 and 20 show the cylinder raised from its bearings ready to receive an endless jacket or apron.

In describing this invention I shall assume that the shafts 23 and 58 are to be driven as required.

1 is a base-plate underlying the whole machine and made of a single casting. There are two end members of the frame, each of which consists of two boxed uprights 2 and 3 and a connecting member 4 at the top. The uprights 2 and 3 at one end are connected in the plane of their inner sides by a web 5. The uprights at the opposite end are connected in the plane of their outer sides by a web 6. The web 5 is so located and is so conformed at its top that the bed-plate, when lowered to no pressure, may be moved endwise between it and the member 4; also so that the shaft 23 and the cams carried by it can be moved endwise between the web and the base-plate. The cylinder 7 is mounted in stationary bearings upon the members 4. The bed-plate 8 is located immediately below it and is provided with end projections 9 and 10. The projection 10 slides vertically in guideways formed in the detachable plate 11, which depends from one of the members 4. The projection 9 slides in guideways on a similar plate depending from the other member 4, which is shown as removed, Fig. 2, preparatory to sliding the bed-plate out endwise at that end of the machine. Inside of the plate 11, at each end of the machine, is a shorter plate 12, extending the full width of the member 4 and provided with guides corresponding with the upper portion of the guides in plate 11. These plates 12 project down far enough so as to engage the projections 9 and 10 from the bed-plate when the latter is in pressing position, but do not extend down far enough to obstruct the removal of the bed-plate endwise when the pressure is released. These plates 12 therefore, while not obstructing the removal of the bed-plate, are fixtures and may be so constructed as to locate the bed-plate in its pressing position with absolute accuracy.

In each of the end members of the frame, between the uprights 2 and 3, which afford vertical guideways for the same, is located a vertically-sliding carriage 13, each of which carriages is shackeled to one end of the bed-plate by a link 14. Each of the carriages 13 may be held in place in its guideways by the detachable pieces 15. Upon the oscillating shaft 23, at both ends, are mounted the eccentrics 16. A block 17 is interposed between each eccentric and the carriage 13. Now it will be observed that when in the oscillation of the shaft 23 the eccentrics are moved into the position shown in Fig. 1 the parts above the eccentric will be forced upward, so as to thrust the bed-plate into pressing position against the cylinder; but when the eccentrics are in the position shown in Figs. 2, 4, and 5 the parts will be lowered so as to release the pressure and place the bed-plate in the position for being slid out endwise. When in this position, the bed rests upon the top of a bracket 18, secured to the inner side of the web 5 and projecting to a point beyond the middle of the machine. The upper surface of this bracket is planed, so as to present a horizontal slide for the bed-plate, which is correspondingly planed on its back flanges, to each side of which back flanges is fastened a rack 19, the teeth of which engage with the pinions 20, mounted on a shaft 21 close to the web 5.

Figures 1, 2:
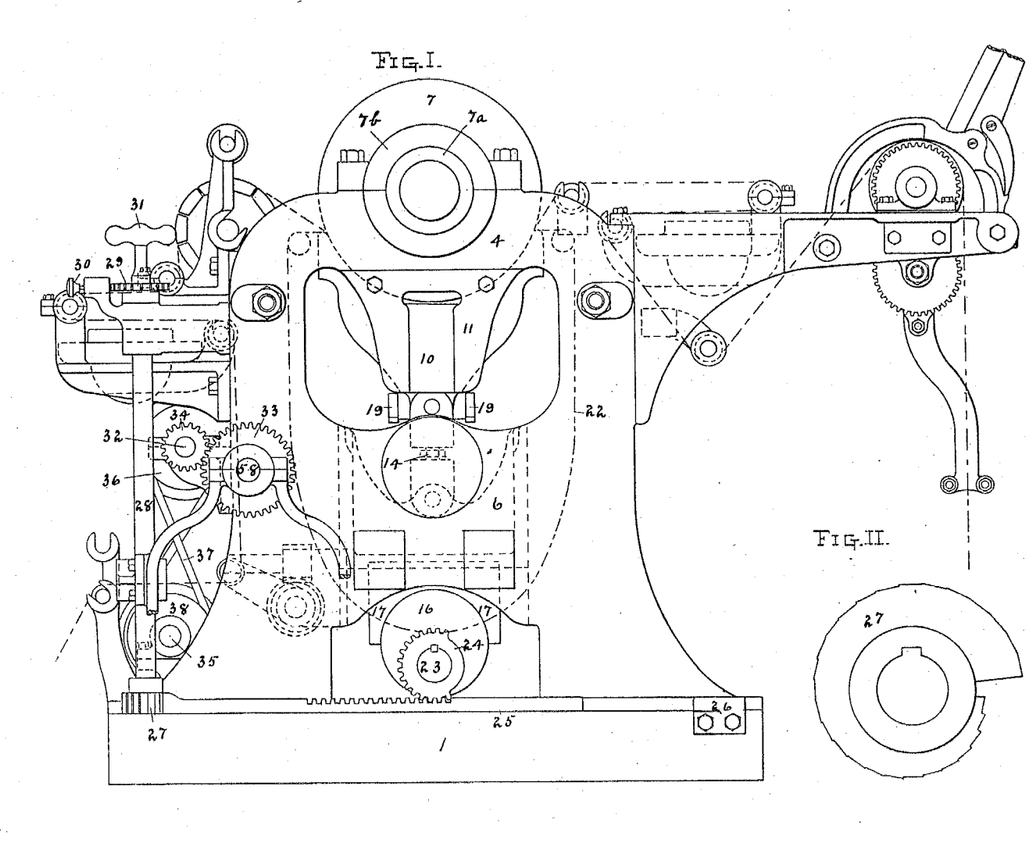
Figure 1 is an elevation of the right-hand end of the machine with the bed in pressing position.
Fig. 2 is an elevation of the left-hand end of the machine with the bed in a releasing position.
Figure 2:
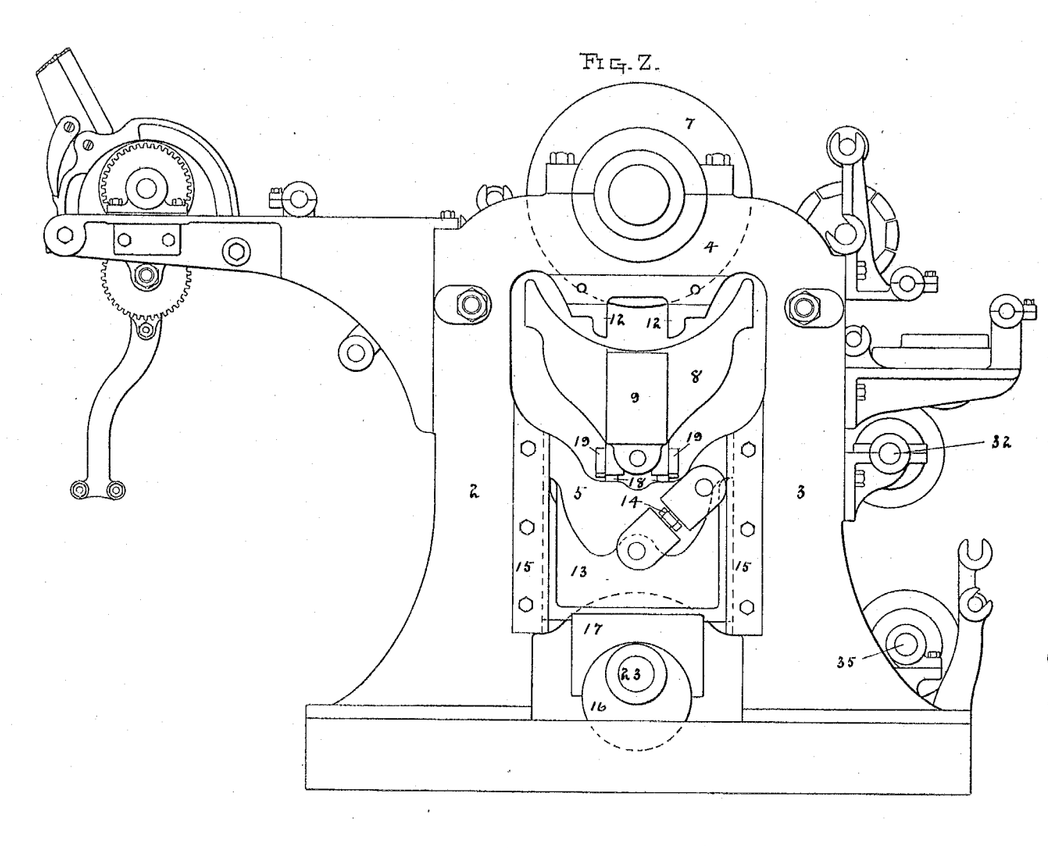
Figure 3:
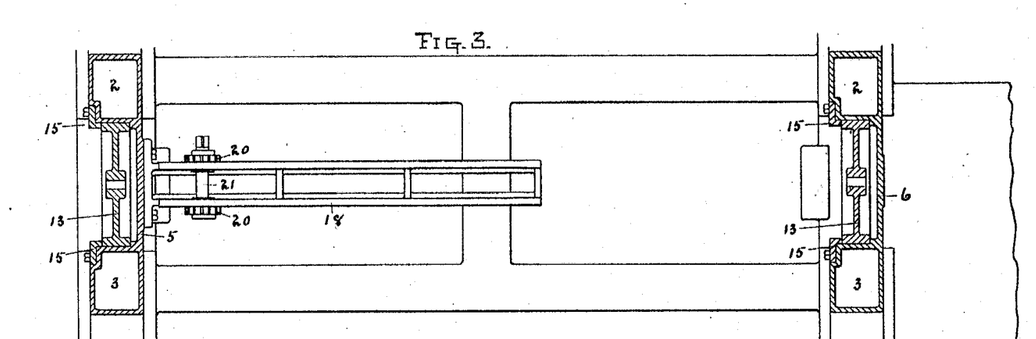
Fig. 3 is a detail plan of the base-plate and the bracket, which holds the bed and the end members of the frame in horizontal section.
Figure 4:
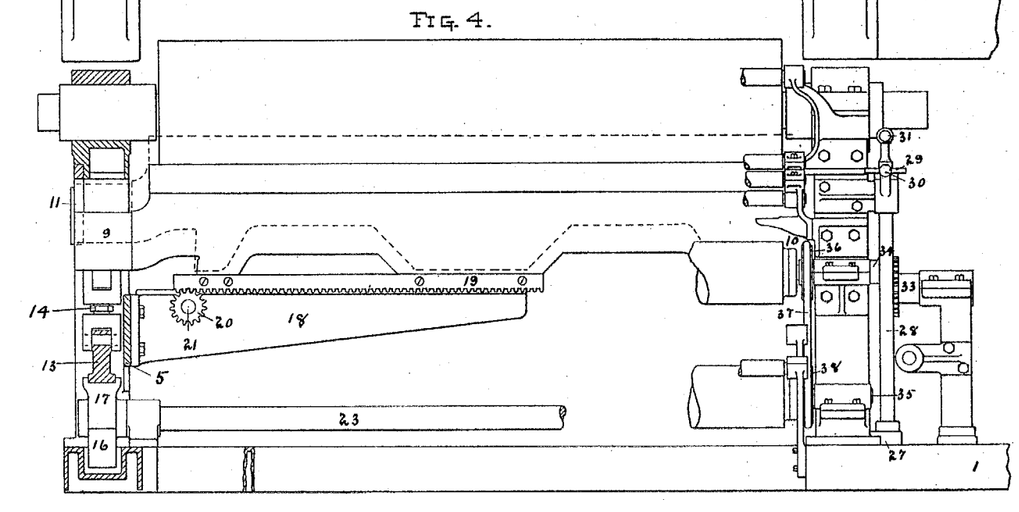
Fig. 4 is an elevation, partly in section, with certain parts omitted.
Figure 5:
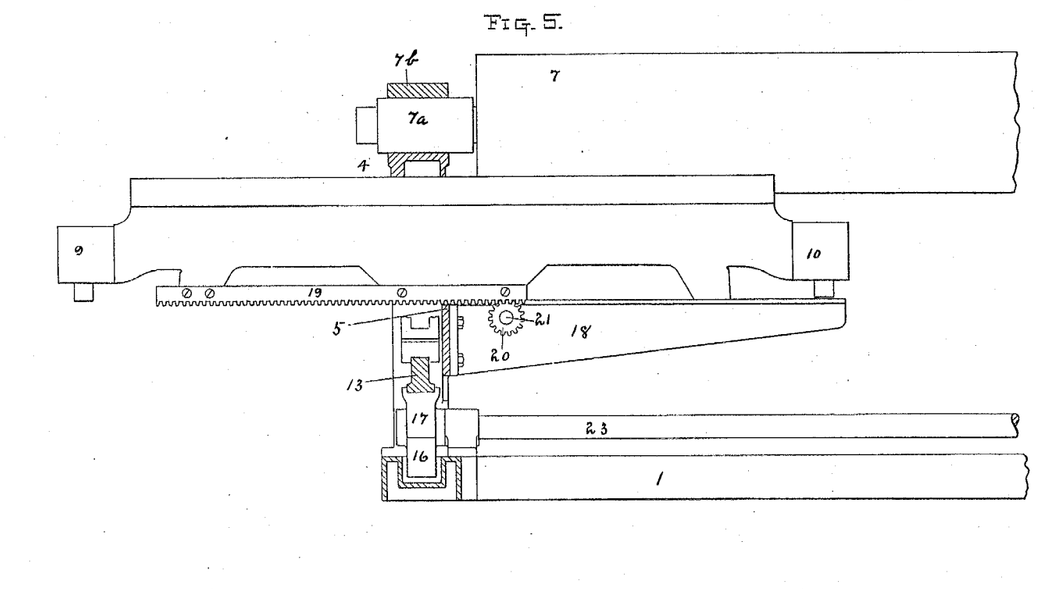
Fig. 5 is a detail vertical section showing the bed-plate in the act of being removed.

The racks 19 are shown in Figs. 2, 4, and 5 as projecting downward on each side of the top of the bracket 18, upon the top of which the flanges of the bed-plate rest, so that there is substantially a tongue-and-groove guideway between the bottom of the bed-plate with its racks and the top of the bracket, insuring accuracy of longitudinal movement as the bed-plate is moved.

When the bed-plate has been lowered so as rest on the bracket 18, by removing one of the plates 11, unshackling the links 14 from the bed-plate, and operating the pinions 20 the bed-plate can be caused to travel endwise out of the machine, as represented in Fig. 5. This ready means of removing the bed-plate is not only useful in the many ordinary cases in which it is desirable to have access to the bed or the pressing-surfaces, but also, and mainly, to facilitate the insertion and removal of an endless apron 22. (Shown in dotted lines in Fig. 1.)

When the bed-plate is in the position shown in Fig. 5, the apron can be slipped over the inner end of the bed-plate, so as to hang around it and the bracket 18, and upon shoving the bed-plate back into its normal position the apron will be in position for use after being smoothed out.

24, Fig. 1, is a segment-gear fixed upon the shaft 23 and engaging with a rack 25. This rack abuts at one end against the stationary stop 26 and at the other end against the adjustable stop 27, which consists of a spiral cam having steps upon its periphery, as shown in Fig. 11. This cam is mounted upon the bottom of an upright shaft 28, which carries a dial 29, by which the operator can set the cam 27 in any desired position by pulling the spring-detent 30 and moving the handle 31 in accordance with the position in which the cam 27 is set. The distance to which the rack 25 may move in that direction will be varied. Thus the oscillation of the shaft 23 will be arrested at a positive point in one direction and at an adjustable point in the other direction, by which the amount of pressure exerted by the bed-plate may be adjusted to a nicety. Inasmuch as the effective lift of the eccentric increases as the bed approaches the pressing position, the rise of the steps on the cam 27 is made to increase in corresponding ratio. The brush-shaft 32 is driven from the shaft 58 by the pinions 33 and 34. The brush-shaft 35 is driven from the brush-shaft 32 by the pulley 36, the belt 37, and the pulley 38.

Figure 6:
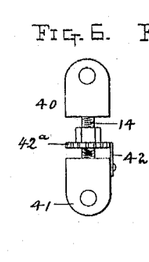
Figure 7:
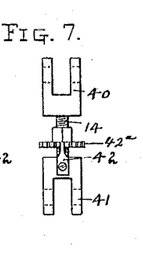

It is sometimes desirable to vary the adjustment of a bed-plate, as, for instance, where the diameter of the cylinder has been reduced by turning in a lathe, and it is very desirable in such cases that the operator may have something to guide his adjustment, so that he can regulate it and also to make it correspond at opposite ends of the bed-plate. For this purpose I provide the link by which the bed-plate is shackled to its operating mechanism with the attachment shown in Figs. 6 and 7. To the link 14, which is screw-threaded to the shackle-heads 40 and 41 by right and left hand screw-threads, I fix a disk $42^a$, provided with notches on its periphery, on which disk for each notch is a number forming a dial. To one of the shackle-heads 41 I attach a spring 42, which normally rests in any of the notches, but may be sprung from one notch to another as the dial is turned. Thus as the link 14 is turned the extent is registered by the spring 42 and the number on the dial which is moved to it.

Figure 8:
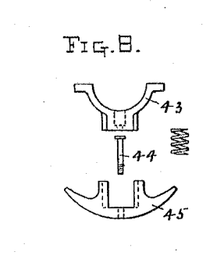
Figure 9:
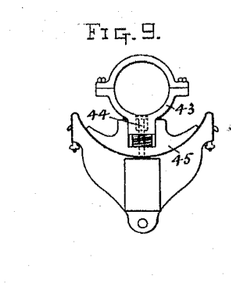
Figure 10:
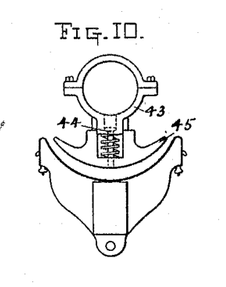

To hold the edges of the sheet-metal jacket of the bed-plate against the bed-plate, I employ the mechanism shown in my Patent No. 469,372, but to prevent it from being displaced when the bed-plate is removed I provide it with the attachment shown in Figs. 8, 9, and 10. From the collar 43, embracing the cylinder-journal, hangs a bolt 44, which acts to suspend the member 45 when the bed-plate is removed. The head of the bolt is given sufficient vertical play in the member 45 to prevent the bolt receiving any pressure from the bed-plate.

Figures 12, 13:
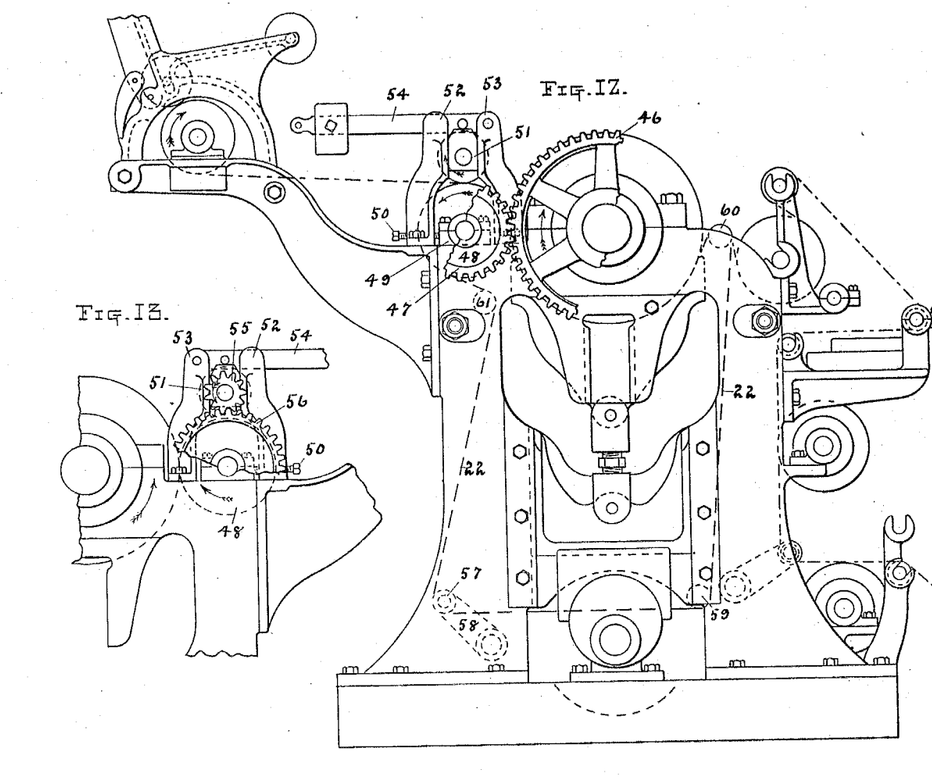
Fig. 12 corresponds with Fig. 1, with additional parts.
Fig. 13 is the opposite end of a portion of Fig. 12.

In Fig. 12, in addition to the parts already described, are the following: 46 is a spur-wheel fixed upon the cylinder-shaft, with which meshes a gear 47, fixed upon the shaft of a smaller cylinder 48, which bears against the main cylinder 7. The position of the cylinder 47 may be moved toward and from the cylinder 7, because its bearings are in slides 49, the position of which is controlled by the set-screws 50. 51 is a polishing-roll, the bearings of which are mounted in vertical guideways 52 53 and are pressed downwardly by the weighted lever 54. This polishing-roll is driven in the direction of the arrow through the gear 55, fixed to its shaft and meshing into the gear 56, fixed to its shaft. The endless apron 22, (shown in dotted lines in Fig. 12,) after passing between the main cylinder 7 and the bed-plate, passes around the cylinder 48, which latter acts as a draft-roll or carrier for it. The surface motion of the cylinder 48 is a trifle faster than the surface motion of the cylinder 7, so as to exert a slight pull upon the endless apron in the direction in which it is traveling and to assist in taking it away from the bed-plate. The cloth also receives the additional pressure of the cylinder 48 and the pressure and polish of the roll 51 after it leaves the bed-plate. The roll 57, mounted upon the swinging arms 58, may act as a take-up for the slack of the apron, while rolls 59, 60, and 61 are merely idlers.

Figures 14, 15, 16, 17, 18:
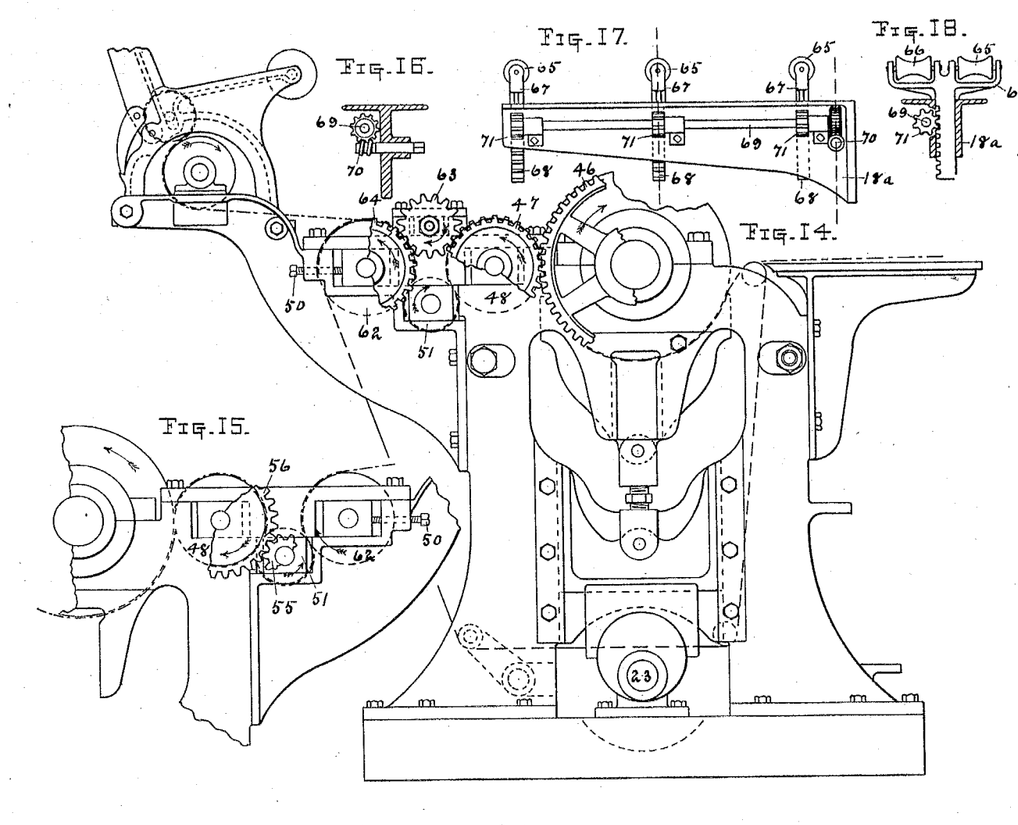
Fig. 14 is the same as Fig. 12, with other parts added.
Fig. 15 is the opposite end of a portion of Fig. 14.
Figs. 16, 17, and 18 are details.

In Fig. 14 the polishing-roll 51 is arranged in a different position, but performs the same function. There is here added a cylinder 62. The gear 47 drives an intermediate gear 63, which drives the gear 64, fixed upon the shaft of cylinder 62, which is thus driven in the same direction as the cylinder 48. The bearings of the cylinder 62 of the polisher 51 and of the cylinder 48 are all mounted in horizontal guideways, so that pressure exerted upon the bearings of the cylinder 62 by the set-screw 50 will be communicated from one to the other and shove them all toward the cylinder 7. By changing the size of the gears 55 and 56 in either the construction shown in Fig. 12 or that shown in Figs. 13, 14, and 15 the speed of the polisher may be changed at will. The circumferential speed of the cylinder 62 will be a trifle greater than that of the cylinder 48.

Figures 18, 20:
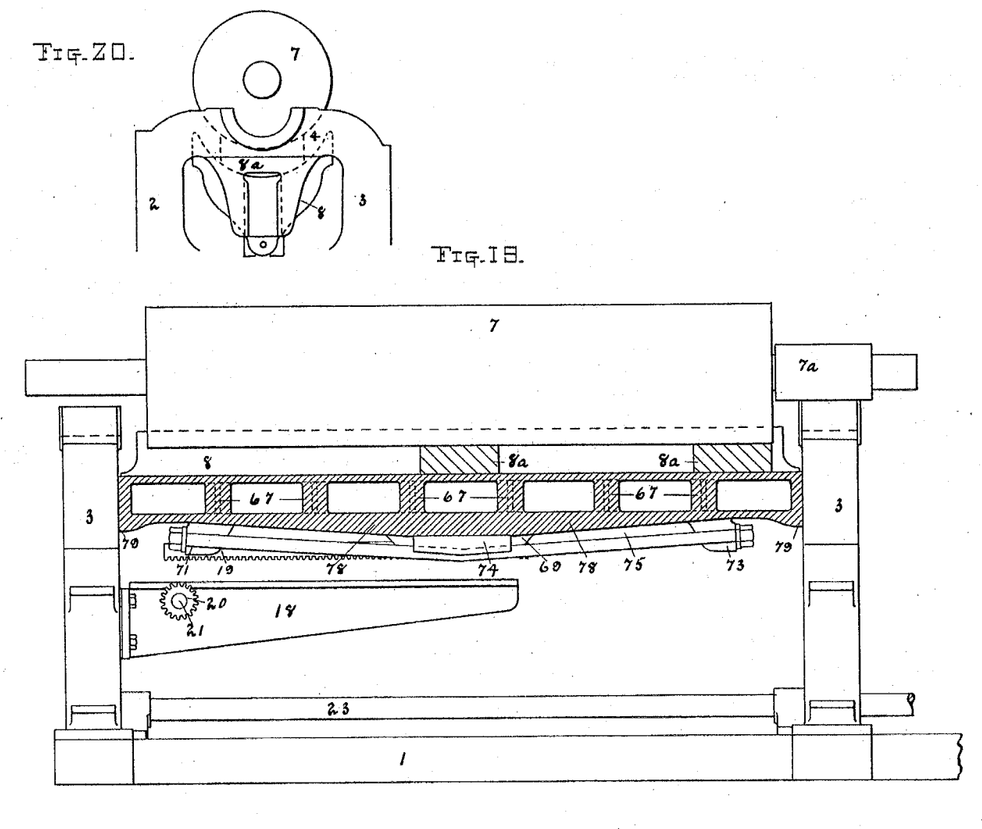

In Figs. 16, 17, and 18 I have shown in detail an attachment which may be applied to the frame of Fig. 14 for the purpose of raising the cylinders 48 and 62 to permit the apron to be slipped over the ends of them. A series of rollers 65 are placed in position beneath the cylinder 48, and a second series of rollers 66 is placed in position below the the cylinder 62. The two series of rollers 65 and 66 are supported in frames 67, from which project downward the racks 68, having vertical bearings in the bracket 18$^a$. 69 is a shaft having bearings fixed to the bracket 18$^a$ and turned by the worm 70. Upon this shaft are fixed the pinions 71, gearing into the racks 68. It will now be apparent that when the caps for the bearings of the cylinders 48 and 62 are removed and the worm 70 is turned so as to raise the series of rollers 65 and 66 those rollers will come up against the under side of the cylinders and lift them bodily above the frame, so that they can be slid endwise to admit of the application or removal of the apron on the same principle as shown for the bed-plate in Fig. 5. These cylinders being comparatively light can be moved endwise by hand upon the carrying-rollers 65 and 66. Sometimes it is also desirable to apply an apron around the cylinder. To do this, the bed-plate is first lowered until it rests upon the bracket 18, whereupon suitable blocks 8$^a$, of either cork or wood, are placed between bed and cylinder, so that after removing the caps from the cylinder-bearings the cylinder will be carried up, together with the bed, as soon as the latter is raised, until its bearings clear the frame of the machine, as shown in Figs. 19 and 20. After pulling off one of the bushings 7$^a$ it will be easy to slip an apron over one end of the cylinder until stopped by one of the blocks 8$^a$ near the middle of the cylinder, which blocks 8$^a$, after lowering bed-plate and cylinder to their original position, are then removed, when the apron may be straightened out and adjusted, and the machine will be ready for operation as soon as the bushing and caps of the cylinder have been replaced.

I claim—

1. In a cloth-pressing machine, in combination, the cylinder, the bed-plate, supports for the same at each end, and a bracket extending part way between said supports whereon said bed-plate is supported in being removed, substantially as described.

2. In a cloth-pressing machine, in combination, the cylinder, the bed-plate, supports for the same at each end and an intermediate support whereon the bed-plate rests in being removed, substantially as described.

3. In a cloth-pressing machine, in combination, the cylinder, the bed-plate, supports for the same at each end, an intermediate support whereon the bed-plate rests in being removed and an endless apron, substantially as described.

4. In a cloth-pressing machine, in combination, the cylinder, the bed-plate, supports for the same at each end, an intermediate support whereon the bed-plate rests in being removed and mechanism whereby the bed-plate is moved endwise, substantially as described.

5. In a cloth-pressing machine, in combination, the cylinder, the bed-plate, supports for the same at each end, an intermediate support whereon the bed-plate rests in being removed and mechanism whereby the bed-plate is moved toward the cylinder or onto said support, substantially as described.

6. In a cloth-pressing machine, in combination, the cylinder, the bed-plate, end frames for the cylinder, guideways for the bed-plate carried by said end frames, the shaft 23, the carriages 13, means interposed between said shaft and said carriages for operating the latter and a detachable connection between said shaft and said bed-plate; the axis of the cylinder, the center of the bed-plate and the axis of the shaft 23 being located in substantially the same plane, substantially as described.

7. In a cloth-pressing machine, two end frames, a cylinder having stationary bearings on the upper portion thereof, a bed-plate the central line of the pressing-surface of which is in substantially the same vertical plane with the cylinder, guideways on said frames for said bed-plate, carriages located beneath each end of said bed-plate, guideways for said carriages and means for reciprocating said carriages, substantially as described.

8. In a cloth-pressing machine, in combination, the cylinder, the bed-plate, the endless apron, the supplemental cylinder 48 whereby said apron is held against the main cylinder at the delivery side of the bed-plate and means whereby said supplemental cylinder is driven, substantially as described.

9. In a cloth-pressing machine, in combination, the cylinder, the bed-plate, the endless apron, the supplemental cylinder 48 whereby the apron is held against the cylinder at the delivery side of the bed-plate and the polishing-roll 51 acting upon the cloth at the delivery end of the apron, substantially as described.

10. In a cloth-pressing machine, in combination, the cylinder, the bed-plate, the supplemental cylinder 48, the second supplemental cylinder 62 and the polishing-roll 51 located intermediate the two, substantially as described.

11. In a cloth-pressing machine, in combination, the cylinder, the bed-plate, the supplemental cylinders 48 and 62, the endless apron passing around both of them and means whereby said supplemental cylinders may be lifted to admit of the application or removal of the endless apron, substantially as described.

12. In a cloth-pressing machine, in combination, the cylinder, end supports for the same, a bed-plate, means for moving said bed-plate to and from the cylinder, a forked support 12 and a projection from the bed-plate engaging the said forked support as the bed-plate comes into pressing position and disengaging from said forked support as the bed-plate recedes from the pressing position whereby the bed-plate is free to be moved endwise from its backward position, substantially as described.

13. In a cloth-pressing machine, in combination, the cylinder, end supports for the same, a bed-plate, means for moving said bed-plate to and from the cylinder, a guide located to engage the bed-plate as the bed-plate comes into pressing position and disengaging from the same as the bed-plate approaches its backward position and another removable guide engaging the bed-plate in its backward position, substantially as described.

14. In a cloth-pressing machine, in combination, the cylinder, the bed-plate, supports for the same at each end, an intermediate support whereon the bed-plate rests in being removed and a removable guide whereby the bed-plate is guided in its backward position, substantially as described.

15. In a cloth-pressing machine, in combination, the cylinder, the bed-plate, the end frames, one of which is provided with an opening through which the bed-plate is removed endwise, a removable guideway connected with one of said end frames for guiding the bed-plate when in operation and a support whereon the bed-plate rests in being removed, substantially as described.

16. In a cloth-pressing machine, in combination, the cylinder, bed-plate, supports for the same at each end, an intermediate support whereon the bed-plate rests in being removed; the said bed-plate and support being provided with guideways coacting to direct the longitudinal movement of the bed-plate in being removed or inserted, substantially as described.

17. In a cloth-pressing machine, in combination, the cylinder, the bed-plate, the endless apron, the end frames one of which is provided with an opening for the endwise removal of the bed-plate, means whereby said bed-plate is supported when partially removed endwise whereby the apron may be passed over the end of the bed-plate between the end of the bed-plate and the opposite end frame, the means of this support for the bed-plate being fastened to the end frame which has the opening in it for the endwise removal of the bed-plate.

18. In a cloth-pressing machine, in combination, the cylinder, the bed-plate, supports for the same at each end, an endless apron surrounding the bed-plate and a bracket projecting a portion of the length of said bed-plate whereby the bed-plate is supported in being removed without interfering with the insertion of the apron, substantially as described.

19. In a cloth-pressing machine, in combination, the cylinder, the bed-plate, the end frames supporting the bed-plate one of which is provided with an opening to permit the endwise removal of the bed-plate and the bracket extending from one of said end frames part of the way toward the other whereby said bed-plate is supported in being removed, an endless apron and supports whereby said endless apron is guided in operation around said bed-plate and said bracket, substantially as described.

20. In a cloth-pressing machine, in combination, an endless apron, a pressing member carrying the same, end supports for said pressing member and an intermediate support extending part way between said end supports whereon said pressing member may be supported for the application of the apron, substantially as described.

21. In a cloth-pressing machine, in combination, the cylinder, the bed-plate, the supplemental cylinder 48, the endless apron passing around said bed-plate and said supplemental cylinder and means whereby said supplemental cylinder may be lifted to permit of the application or removal of the endless apron, substantially as described.

22. In a cloth-pressing machine, in combination, the cylinder, the bed-plate, the endless apron, the end frames one of which is provided with an opening for the endwise removal of the bed-plate, means whereby said bed-plate is supported when partially removed endwise whereby the apron may be passed over the end of the bed-plate between the end of the bed-plate and the opposite end frame, substantially as described.

DAVID GESSNER.

Witnesses:
W. HENRY RAMSDELL,
L. A. GESSNER.